(12) United States Patent
Awoniyi-Oteri et al.

(10) Patent No.: US 11,792,815 B2
(45) Date of Patent: Oct. 17, 2023

(54) SEMI-PERSISTENT SCHEDULING FOR EXTENDED REALITY

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 17/304,816

(22) Filed: Jun. 25, 2021

(65) Prior Publication Data

US 2022/0417975 A1 Dec. 29, 2022

(51) Int. Cl.
*H04W 72/23* (2023.01)
*H04L 1/1812* (2023.01)
*H04W 72/1263* (2023.01)

(52) U.S. Cl.
CPC .......... *H04W 72/23* (2023.01); *H04L 1/1819* (2013.01); *H04W 72/1263* (2013.01)

(58) Field of Classification Search
CPC ......... H04W 72/1289; H04W 72/1284; H04W 72/1278; H04W 72/1263; H04W 72/1205; H04W 72/1294; H04W 72/14; H04L 1/1819; H04L 1/1816; H04L 1/1812
See application file for complete search history.

(56) References Cited

U.S. PATENT DOCUMENTS

| | | | |
|---|---|---|---|
| 2018/0302895 A1* | 10/2018 | Akkarakaran | H04L 5/0094 |
| 2019/0261354 A1* | 8/2019 | Fakoorian | H04L 1/1861 |
| 2019/0320420 A1* | 10/2019 | Zhang | H04L 1/00 |
| 2019/0349964 A1* | 11/2019 | Liou | H04W 72/046 |
| 2020/0351931 A1* | 11/2020 | Babaei | H04W 72/56 |
| 2020/0404632 A1* | 12/2020 | Zhou | H04W 72/042 |
| 2021/0036822 A1* | 2/2021 | Lyu | H04L 5/006 |
| 2021/0045184 A1* | 2/2021 | Sato | H04L 5/0053 |
| 2021/0051665 A1* | 2/2021 | Fakoorian | H04L 1/1896 |
| 2021/0100013 A1* | 4/2021 | Khoshnevisan | H04L 5/0055 |
| 2021/0160879 A1* | 5/2021 | Lin | H04L 1/1854 |

(Continued)

FOREIGN PATENT DOCUMENTS

| | | | | |
|---|---|---|---|---|
| CN | 109219024 | * | 6/2017 | ............ H04W 74/02 |
| KR | 20210093706 A | * | 10/2020 | ............ H04W 72/04 |

(Continued)

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information indicating a first semi-persistent scheduling (SPS) configuration and a second SPS configuration, wherein one or more first SPS occasions defined by the first SPS configuration and one or more second SPS occasions defined by the second SPS configuration are within a time interval associated with a traffic burst of a communication. The UE may receive downlink control information (DCI) activating at least one SPS configuration, of the first SPS configuration and the second SPS configuration. The UE may perform the communication using the at least one activated SPS configuration. Numerous other aspects are described.

30 Claims, 9 Drawing Sheets

(56) References Cited

U.S. PATENT DOCUMENTS

| | | | |
|---|---|---|---|
| 2021/0218504 A1* | 7/2021 | Wang | H04L 5/0044 |
| 2021/0243784 A1* | 8/2021 | Goto | H04L 1/0016 |
| 2021/0250932 A1* | 8/2021 | Liu | H04W 72/0446 |
| 2021/0282164 A1* | 9/2021 | Zhou | H04L 5/0055 |
| 2022/0007389 A1* | 1/2022 | Sun | H04W 72/02 |
| 2022/0094484 A1* | 3/2022 | Babaei | H04L 1/1848 |
| 2022/0109529 A1* | 4/2022 | Ye | H04W 52/50 |
| 2022/0116964 A1* | 4/2022 | Islam | H04L 1/1887 |
| 2022/0141860 A1* | 5/2022 | Elshafie | H04W 76/36 |
| | | | 455/452.1 |
| 2022/0225360 A1* | 7/2022 | Yi | H04W 72/1268 |
| 2022/0256564 A1* | 8/2022 | Pocovi | H04L 1/1819 |

FOREIGN PATENT DOCUMENTS

| | | | | |
|---|---|---|---|---|
| WO | WO-2020047080 A1 * | 3/2020 | | H04L 27/26 |
| WO | WO-2021101251 A1 * | 5/2021 | | H04L 1/0026 |
| WO | WO-2022184141 A1 * | 9/2022 | | |

* cited by examiner

SEMI-PERSISTENT SCHEDULING FOR EXTENDED REALITY

FIELD OF THE DISCLOSURE

Aspects of the present disclosure generally relate to wireless communication and to techniques and apparatuses for semi-persistent scheduling for extended reality.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving configuration information indicating a first semi-persistent scheduling (SPS) configuration and a second SPS configuration, wherein one or more first SPS occasions defined by the first SPS configuration and one or more second SPS occasions defined by the second SPS configuration are within a time interval associated with a traffic burst of a communication. The method may include receiving downlink control information (DCI) activating at least one SPS configuration, of the first SPS configuration and the second SPS configuration. The method may include performing the communication using the at least one activated SPS configuration.

Some aspects described herein relate to a method of wireless communication performed by a base station. The method may include transmitting, to a UE, configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication. The method may include transmitting DCI activating at least one SPS configuration, of the first SPS configuration and the second SPS configuration. The method may include performing the communication using the at least one activated SPS configuration.

Some aspects described herein relate to a UE for wireless communication. The user equipment may include a memory and one or more processors coupled to the memory. The one or more processors may be configured to receive configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication. The one or more processors may be configured to receive DCI activating at least one SPS configuration, of the first SPS configuration and the second SPS configuration. The one or more processors may be configured to perform the communication using the at least one activated SPS configuration.

Some aspects described herein relate to a base station for wireless communication. The base station may include a memory and one or more processors coupled to the memory. The one or more processors may be configured to transmit, to a UE, configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication. The one or more processors may be configured to transmit DCI activating at least one SPS configuration, of the first SPS configuration and the second SPS configuration. The one or more processors may be configured to perform the communication using the at least one activated SPS configuration.

Some aspects described herein relate to a non-transitory computer-readable medium that stores a set of instructions for wireless communication by a UE. The set of instructions, when executed by one or more processors of the UE, may cause the UE to receive configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication. The set of instructions, when executed by one or more processors of the UE, may cause the UE to receive DCI activating at least one SPS configuration, of the first SPS configuration and the second SPS configuration. The set of instructions, when executed by one or more processors of the UE, may cause the UE to perform the communication using the at least one activated SPS configuration.

Some aspects described herein relate to a non-transitory computer-readable medium that stores a set of instructions for wireless communication by a base station. The set of instructions, when executed by one or more processors of the base station, may cause the base station to transmit, to a UE, configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication. The set of instructions, when executed by one or more processors of the base station, may cause the base station to transmit DCI activating at least one SPS configuration, of the first SPS configuration and the second SPS configuration. The set of instructions, when executed by one or more processors of the base station, may cause the base station to perform the communication using the at least one activated SPS configuration.

Some aspects described herein relate to an apparatus for wireless communication. The apparatus may include means for receiving configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication. The apparatus may include means for receiving DCI activating at least one SPS configuration, of the first SPS configuration and the second SPS configuration. The apparatus may include means for performing the communication using the at least one activated SPS configuration.

Some aspects described herein relate to an apparatus for wireless communication. The apparatus may include means for transmitting, to a UE, configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication. The apparatus may include means for transmitting DCI activating at least one SPS configuration, of the first SPS configuration and the second SPS configuration. The apparatus may include means for performing the communication using the at least one activated SPS configuration.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
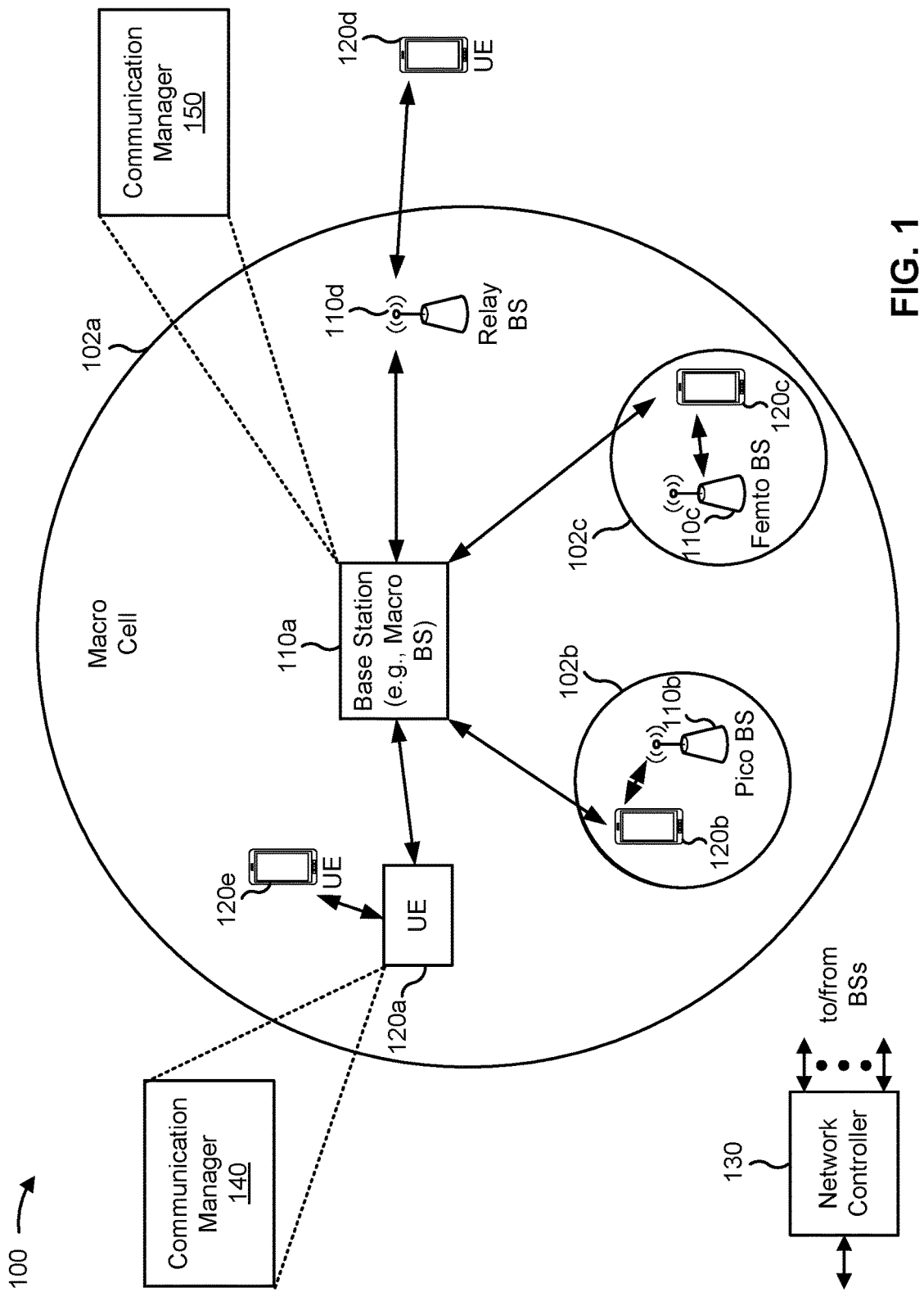
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication; receive downlink control information (DCI) activating at least one SPS configuration, of the first SPS configuration and the second SPS configuration; and perform the communication using the at least one activated SPS configuration. Additionally, or alternatively, the communication manager 140 may perform one or more other operations described herein.

In some aspects, the base station 110 may include a communication manager 150. As described in more detail elsewhere herein, the communication manager 150 may transmit, to a UE, configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication; transmit DCI activating at least one SPS configuration, of the first SPS configuration and the second SPS configuration; and perform the communication using the at least one activated SPS configuration. Additionally, or alternatively, the communication manager 150 may perform one or more other operations described herein.

As indicated above, FIG. 1 is provided as an example. Other examples may differ from what is described with regard to FIG. 1.

Figure 2:
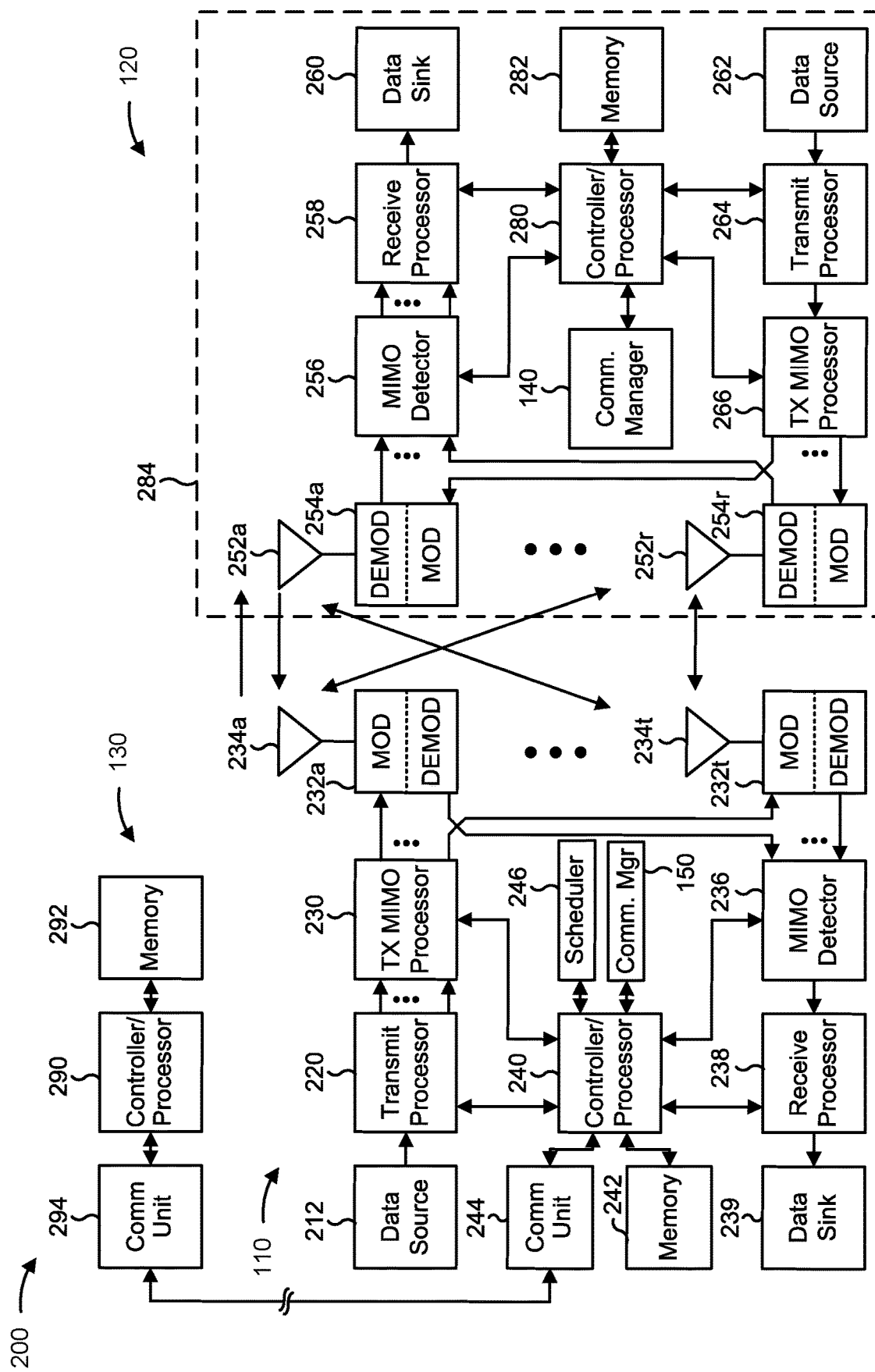
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with semi-persistent scheduling (SPS) configuration for extended reality (XR), as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication; means for receiving DCI activating at least one SPS configuration, of the first SPS configuration and the second SPS configuration; and/or means for performing the communication using the at least one activated SPS configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication; means for transmitting DCI activating at least one SPS configuration, of the first SPS configuration and the second SPS configuration; and/or means for performing the communication using the at least one activated SPS configuration. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Semi-persistent scheduling (SPS) provides a mechanism for allocating periodic resources for communication, such as between a UE and a base station. In SPS, a periodic resource (referred to herein as an SPS occasion) is configured by an SPS configuration with a set of parameters, such as a periodicity, an MCS, a hybrid automatic repeat request (HARD) process identifier, a physical uplink control channel (PUCCH) resource for returning feedback regarding a communication on an SPS occasion, and so on. An SPS configuration is activated by physical layer signaling, such as a physical downlink control channel (PDCCH) carrying downlink control information. Once the SPS configuration is activated, the UE may perform a communication on an SPS occasion associated with the activated SPS configuration. SPS configuration and communication may be well-suited for communications involving bursts of data activity, such as Voice over New Radio (VoNR).

Communications via a network may involve some amount of jitter. Jitter is a variation (that is, uncertainty) in the arrival time of a communication. For example, a jitter value may indicate a deviation of an actual arrival time of a packet relative to a scheduled arrival time of the packet. Jitter can involve a communication arriving earlier than expected, or later than expected. For example, a communication associated with some amount of jitter may arrive before a scheduled resource, during the scheduled resource, or after a scheduled resource. Jitter can be caused by processing timelines, network congestion, route changes, and so on.

Some types of communications may be negatively impacted by jitter. For example, extended reality (XR) communications (described in more detail elsewhere herein) involve the transmission and reception of a number of packets in a periodic fashion. Thus, an SPS configuration may be useful for XR communications, since the SPS configuration may provide a periodic SPS occasion on which to transmit or receive XR communications. XR communications may involve bursty communication, wherein the communications are performed via intermittent traffic bursts including one or more packets. In the context of XR, a traffic burst may represent a rendered scene. In some aspects, a traffic burst is a communication or a portion of a communication including one or more packets. A communication may be performed via periodic traffic bursts. Such a communication may be characterized by relatively short traffic bursts separated by relatively long periods of inactivity, which makes such communications suitable for SPS. However, the jittery nature of communications via a wireless network, such as a 5G/NR network, may lead to packets for XR communications being received before or after an SPS occasion configured for the XR communications. Furthermore, in some cases, the amount of traffic to be transmitted at a given time (e.g., in a traffic burst) may exceed the capacity of an SPS occasion associated with the given time. Packets being received outside of an SPS occasion configured for the XR communications, and overwhelming the capacity of a given SPS occasion, may lead to delays in XR communication, diminished throughput, and degraded user experience.

Some techniques and apparatuses described herein enable the configuration of multiple SPS configurations, such as a first SPS configuration and one or more second SPS configurations. The one or more second SPS configurations may configure SPS occasions that are within a time interval associated with a traffic burst relative to an SPS occasion configured by the first SPS configuration. For example, the one or more second SPS configurations may configure SPS occasions that are within a range of an expected jitter of a communication. For example, if a communication is associated with a jitter of +/−(plus or minus) 5 ms, then the SPS occasions configured by the one or more second SPS configurations may be within 5 ms of the first SPS occasion (before and/or after the first SPS occasion). Furthermore, some techniques and apparatuses described herein provide signaling associated with configuring multiple SPS configurations for a communication associated with jitter, such as feedback resource configuration and piggybacking of data on feedback regarding the communication. In this way, delays in communication associated with jitter (such as XR communications) are reduced, throughput is improved, and user experience is improved. User experience may be particularly improved for XR communications, where users are sensitive to issues caused by delays in communications.

Figure 3:
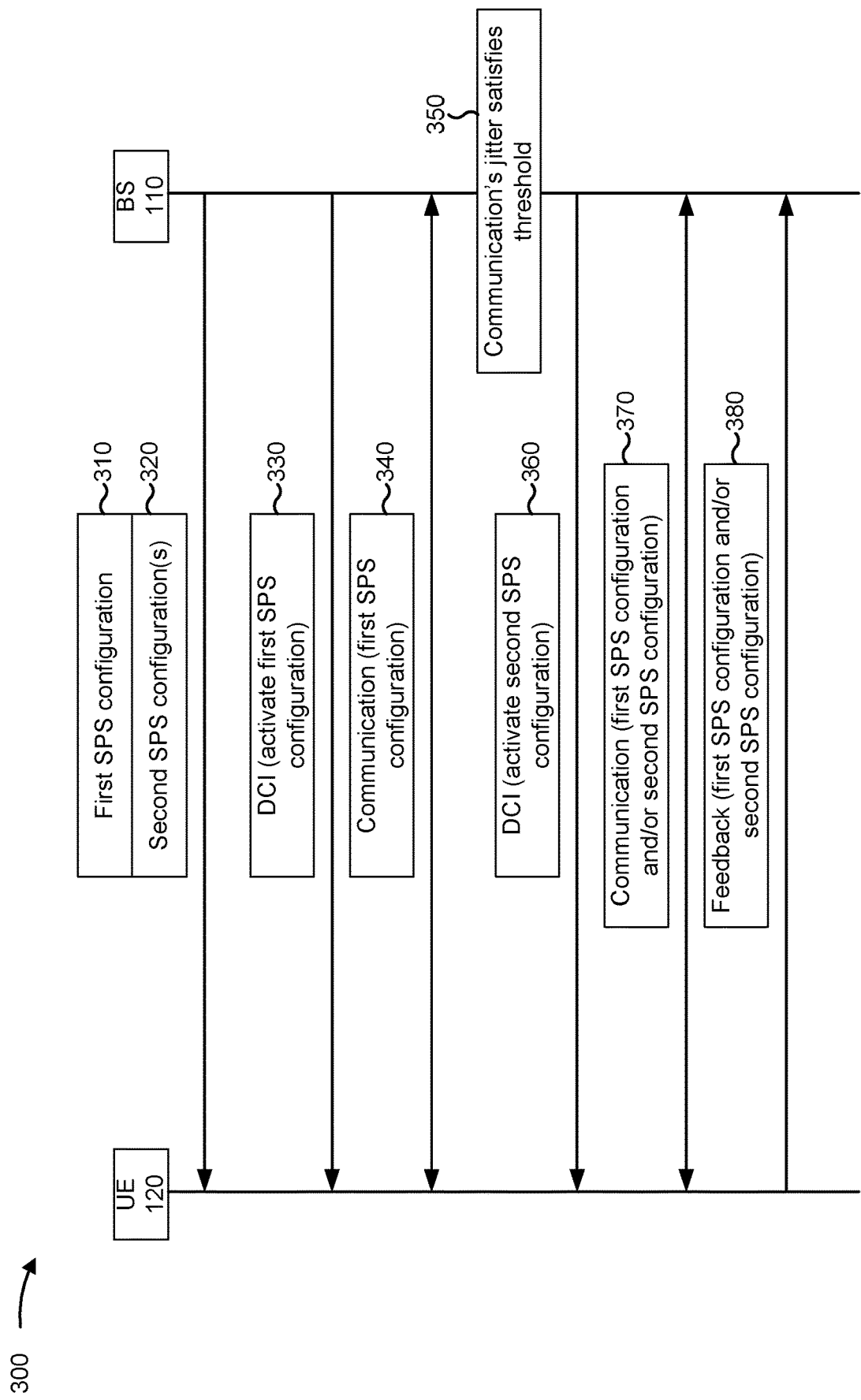
FIG. 3 is a diagram illustrating an example of signaling associated with configuring multiple semi-persistent scheduling (SPS) configurations for a communication, in accordance with the present disclosure.

FIG. 3 is a diagram illustrating an example 300 of signaling associated with configuring multiple SPS configurations for a communication, in accordance with the present disclosure. As shown, example 300 includes a UE 120 and a base station 110. The UE 120 and the base station 110 may perform a communication with each other. In some cases, the communication may be subject to some amount of jitter. In some aspects, the communication is an XR communication. "XR" is a term referred to real-and-virtual combined environments and human-machine interactions generated by computer technology and wearables. Non-exhaustive examples of XR include augmented reality, mixed reality, and virtual reality. XR may involve some amount of network communication. For example, in some implementations, some amount of processing may be performed at a server, such as to generate a scene which is communicated to the UE via a traffic burst. As another example, a UE may access data stored remotely to the UE for use in an XR environment. Techniques and apparatuses described herein provide resilience for XR communications involving jitter by configuring (and optionally activating) multiple SPS occasions within a time window associated with jitter.

As shown in FIG. 3, and by reference numbers 310 and 320, the base station 110 may provide, to the UE 120, configuration information. For example, the base station 110 may provide the configuration information via radio resource control (RRC) signaling, medium access control (MAC) signaling, or the like. The configuration information may indicate a first SPS configuration (shown by reference number 310) and one or more second SPS configurations (shown by reference number 320, and sometimes referred to herein as "a/the second SPS configuration" for brevity). In some aspects, the base station 110 may configure the first SPS configuration and the second SPS configuration based at least in part on the UE 120 signaling capability information indicating that the UE 120 supports SPS. In some aspects, the UE 120 may signal capability information indicating that the UE 120 supports multiple SPS occasions within a time window associated with jitter of a communication, and the base station 110 may configure the first SPS configuration and the second SPS configuration based at least in part on the capability information.

In some aspects, the base station 110 may provide the first SPS configuration with the second SPS configuration, such as via a single RRC message. In some aspects, the base station 110 may provide the first SPS configuration separately from the second SPS configuration. For example, the base station 110 may first configure the first SPS configuration and may use the first SPS configuration for communication with the UE 120. The base station 110 may determine that the communication's jitter satisfies a threshold, such as shown by reference number 350. The base station 110 may then configure (and optionally activate) the second SPS configuration based at least in part on the communication's jitter satisfying the threshold. Configuring the first SPS configuration and the second SPS configuration contemporaneously may conserve signaling resources, whereas configuring the first SPS configuration and the second SPS configuration separately may improve communication resource flexibility.

An SPS configuration (such as the first SPS configuration or the second SPS configuration) may include a set of SPS parameters. An SPS parameter may include, for example, a resource for one or more SPS occasions configured by the SPS configuration, a periodicity (e.g., a time interval between consecutive SPS occasions), a number of HARQ processes for the SPS occasions, a PUCCH resource for feedback associated with the SPS occasion, an MCS for communication on the SPS occasion, or other parameters described elsewhere herein. In some aspects, one or more of the SPS parameters may be shared between (e.g., the same for) the first SPS configuration and the second SPS configuration. For example, the first SPS configuration and the second SPS configuration may have the same periodicity, the same MCS, or the like.

Figure 4:
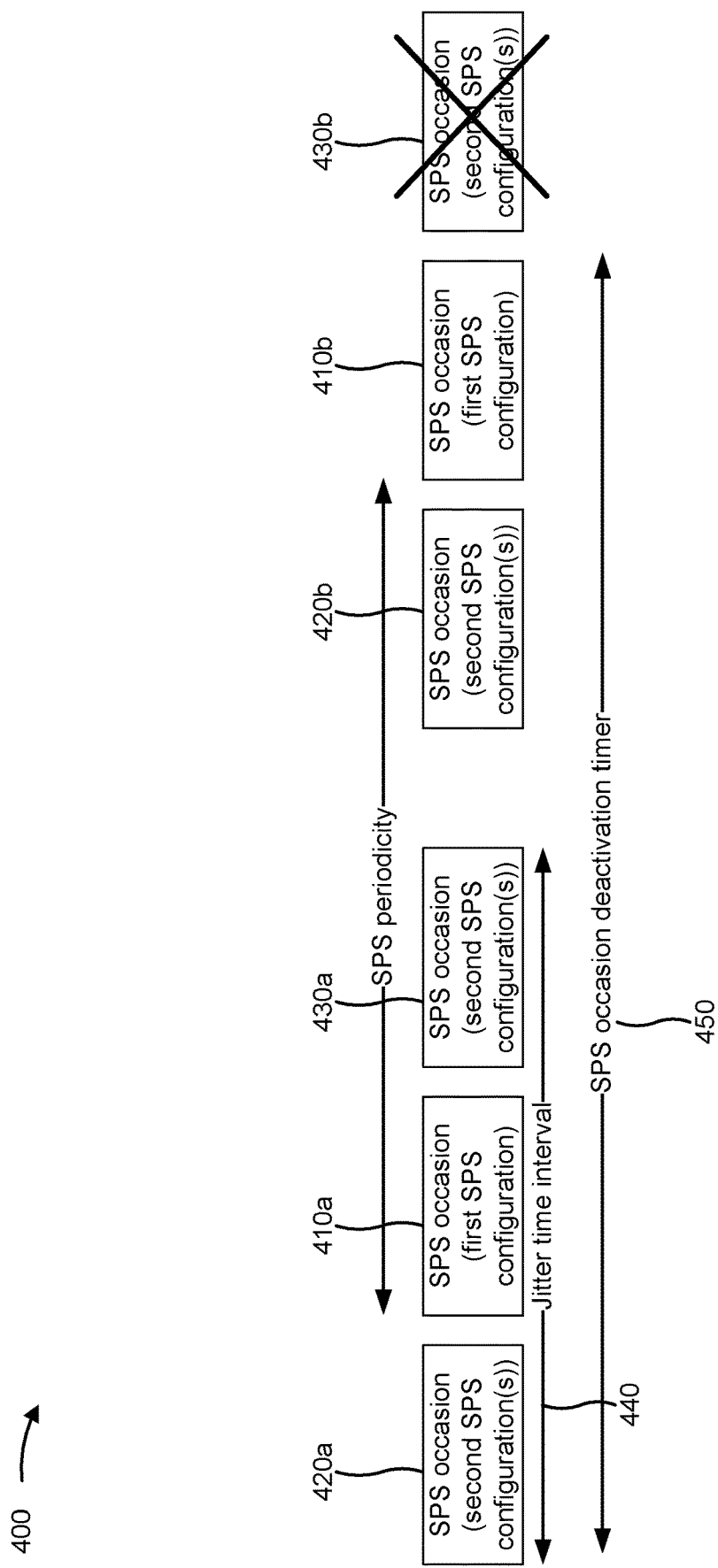
FIG. 4 is a diagram illustrating an example of SPS occasions associated with a first SPS configuration and one or more second SPS configurations, in accordance with the present disclosure.

FIG. 4 is a diagram illustrating an example 400 of SPS occasions associated with a first SPS configuration and one or more second SPS configurations, in accordance with the present disclosure. Two SPS occasions configured by a first SPS configuration are shown by reference numbers 410a and 410b. A first pair of SPS occasions configured by one second SPS configuration are shown by reference numbers 420a and 420b, and a second pair of SPS occasions configured by another second SPS configuration are shown by reference numbers 430a and 430b. As shown, each of the SPS configurations is associated with a same SPS periodicity. In some aspects, a single SPS configuration may configure an SPS occasion 420 and an SPS occasion 430.

As shown, the SPS occasions of example 400 occur within a time interval, shown by reference number 440. This time interval may be associated with a traffic burst of the communication. For example, the time interval may be based at least in part on an amount of jitter associated with the communication and/or based at least in part on a length and/or a scheduled or expected arrival time of a traffic burst of the communication. In some aspects, the time interval may be configured to include a length of time associated with an expected jitter of a traffic burst, and may be centered on a scheduled or expected arrival time of the traffic burst. For example, the SPS occasions 420 occur before the SPS occasions 410 and within the time interval, and the SPS occasions 430 occur after the SPS occasions 410 and within the time interval. In some aspects, the base station 110 may determine the time interval. For example, the base station 110 may determine information regarding jitter (such as statistics regarding arrival time or deviation from an expected arrival time), such as based at least in part on times at which communications from the UE 120 transmitted on an SPS occasion are received. The base station 110 may determine the time interval based at least in part on the information regarding jitter. For example, the base station 110 may set the time interval so that each SPS occasion of the first SPS occasion and the one or more second SPS occasions are included within an observed range of jitter, within a standard deviation associated with the jitter, or the like.

As shown by reference number 450, the first SPS configuration and the one or more second SPS configurations may be associated with a deactivation time interval. A deactivation time interval may indicate a length of time after which an SPS configuration is to be released. For example, if SPS occasions of an SPS configuration are not used for the length of the deactivation time interval, then the UE 120 and the base station 110 may release the SPS configuration. In some aspects, the deactivation time interval may be specific to an SPS configuration. For example, the UE 120 may release the first SPS configuration only if SPS occasions 410 are unused for the length of the deactivation time interval without regard for whether SPS occasions 420 and 430 are used. In some other aspects, the deactivation time interval may not be specific to an SPS configuration. For example, the UE 120 may release any SPS configuration of the SPS configurations associated with SPS occasions 410, 420, and 430, after none of the SPS occasions 410, 420, and 430 are used for the duration of the deactivation time interval.

As shown by reference number 330, the UE 120 may receive, from the base station 110, first DCI. For example, the base station 110 may transmit the first DCI via a PDCCH. The first DCI may indicate to activate the first SPS configuration. For example, the base station 110 may transmit the first DCI based at least in part on initiating or continuing the XR communication. In some aspects, the first SPS configuration (and the one or more second SPS configurations) may have a periodicity equal to or based at least in part on a length of a periodicity associated with the XR communication.

As shown by reference number 340, the UE 120 and the base station 110 may perform a communication using the first SPS configuration. For example, the UE 120 may transmit, and the base station 110 may receive, uplink communications on SPS occasions defined by the first SPS configuration. As another example, the base station 110 may transmit, and the UE 120 may receive, downlink communications on SPS occasions defined by the first SPS configuration.

As shown by reference number 350, the base station 110 may determine that the communication's jitter satisfies a threshold. For example, in the case where the first SPS configuration and the second SPS configuration are activated separately from one another, the base station 110 may activate the second SPS configuration based at least in part on determining that the communication's jitter satisfies the threshold. In some aspects, the base station 110 may activate the second SPS configuration based at least in part on determining that the communication exceeds a size that can be conveyed via the first SPS occasion. Thus, the base station 110 may provide additional flexibility and bandwidth for the communication in the case when the jitter satisfies the threshold or the communication exceeds a size that can be conveyed via the first SPS occasion.

As shown by reference number 360, the base station 110 may transmit, and the UE 120 may receive, second DCI activating the one or more second SPS configurations. For example, the base station 110 may transmit the second DCI based at least in part on determining that the communication's jitter satisfies the threshold and/or based at least in part on the communication exceeding a size that can be conveyed via the first SPS occasion. In some aspects, the base station 110 may selectively activate a subset of second SPS configurations, for example, based at least in part on a size of the time window associated with jitter, a size of the communication to be performed, or the like.

In some aspects, the base station 110 may activate only one of the first SPS configuration or the second SPS configuration. For example, the base station 110 may deactivate the first SPS configuration prior to or concurrently with activating the second SPS configuration. In some other aspects, both of the first SPS configuration and the second SPS configuration may be active concurrently.

As shown by reference number 370, the base station 110 and the UE 120 may perform the communication using at least one of the first SPS configuration or the second SPS configuration (referred to herein as "the at least one active SPS configuration"). For example, the UE 120 may transmit, and the base station 110 may receive, the communication on SPS occasions of the at least one active SPS configuration. Additionally, or alternatively, the base station 110 may transmit, and the UE 120 may receive, the communication on SPS occasions of the at least one active SPS configuration.

In some aspects, as shown by reference number 380, the UE 120 may transmit feedback regarding the communication. For example, the UE 120 may transmit feedback regarding communications on SPS occasions associated with the at least one active SPS configuration. As mentioned above, resources for the feedback regarding the communication may be configured by the base station 110, such as in association with the first SPS configuration and/or the second SPS configuration.

The feedback transmitted by the UE 120 may be associated with a HARQ process identifier (sometimes referred to as a "HARQ ID"). The HARQ process identifier may be a property of the SPS occasion to which the feedback relates. The SPS occasions of the first SPS configuration, and the SPS occasions of the second SPS configuration(s), may be associated with HARQ process identifiers. In the case where only one of the first SPS configuration or a second SPS configuration is active, the HARQ process identifier allocation (which may be based at least in part on an equation) may be unaffected.

In the case where both of the first SPS configuration and a second SPS configuration are active, the base station 110 may use a hybrid HARQ assignment pool. A hybrid HARQ assignment pool may include a first pool of HARQ process identifiers and a second pool of HARQ process identifiers. The first pool of HARQ process identifiers may be used for the SPS occasions of the first SPS configuration, and the second pool of HARQ process identifiers may be assigned to SPS occasions associated with the second SPS configuration, if the second SPS configuration is activated. As one example, the first pool of HARQ process identifiers may include HARQ process identifiers 0 through 7, and the second pool of HARQ process identifiers may include HARQ process identifiers 8 through 15. In some aspects, the second pool of HARQ process identifiers may be defined based at least in part on an offset. For example, if the first pool of HARQ process identifiers includes HARQ process identifiers 0 through 7, and the second pool of HARQ process identifiers includes HARQ process identifiers 8 through 15, the offset may be 8. In some aspects, the offset may be signaled via DCI (e.g., indicated in the first DCI or the second DCI). In some aspects, SPS HARQ identifiers (e.g., SPS HARQ identifiers for DCI-enabled SPS occasions) may be based at least in part on an equation (e.g., a HARQ ID assignment equation specified in a wireless communication specification) or a random assignment using a pre-determined rule, which may be agreed and followed by both the base station 110 and the UE 120. For example, both the base station 110 and the UE 120 may agree, at each instance, to assign the lowest available ID to the current SPS occasion.

Figure 5:
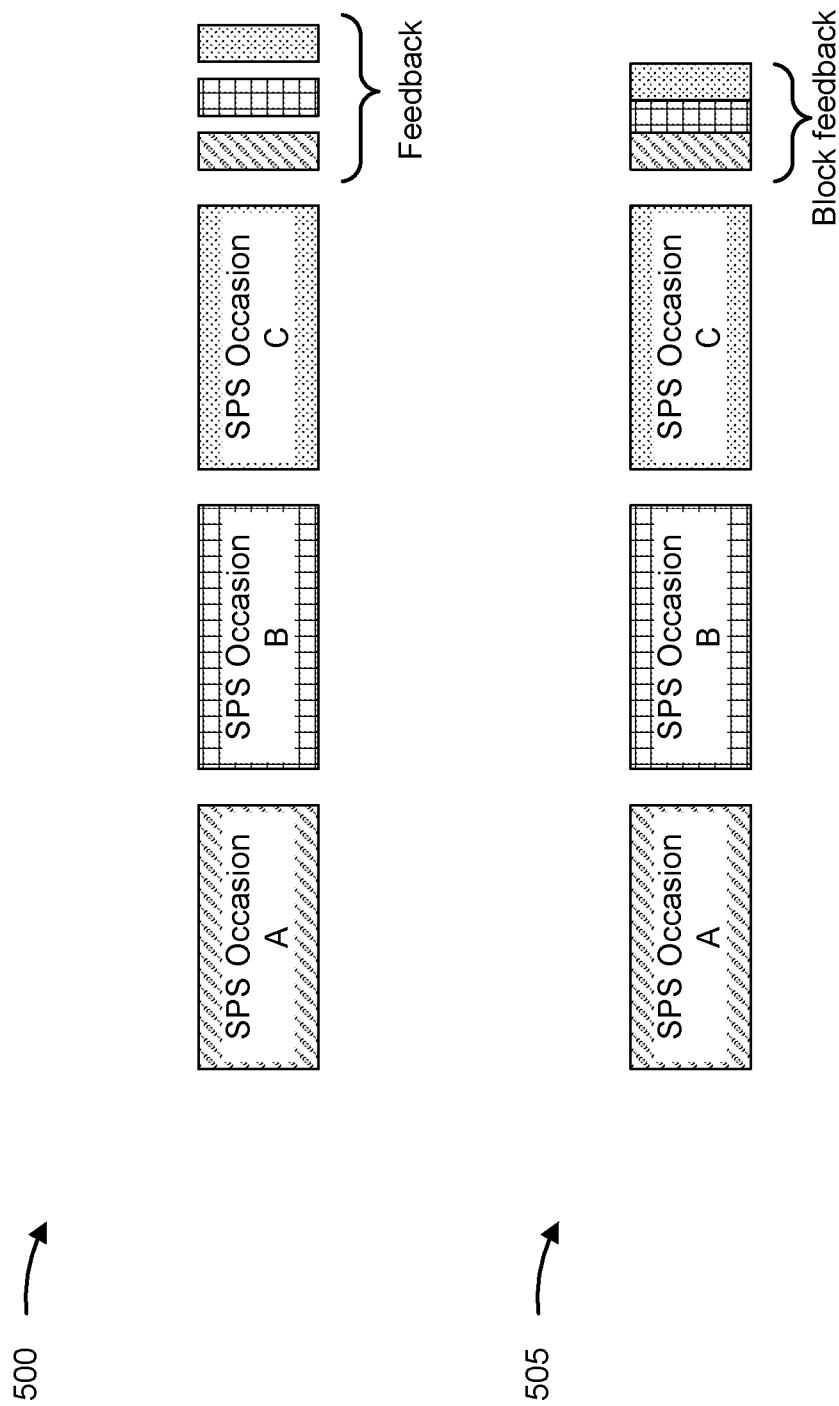
FIG. 5 is a diagram illustrating examples of feedback resources for multiple SPS occasions within a time window associated with jitter, according to the present disclosure.

FIG. 5 is a diagram illustrating examples 500 and 505 of feedback resources for multiple SPS occasions within a time window associated with jitter, according to the present disclosure. Example 500 shows an SPS Occasion A, an SPS Occasion B, and an SPS occasion C. SPS Occasion B may be defined by a first SPS configuration, and SPS Occasions A and C may be defined by one or more second SPS configurations. In examples 500 and 505, a feedback occasion associated with an SPS occasion uses the same fill as the SPS occasion.

In example 500, the base station 110 may indicate a respective feedback resource (e.g., a respective PUCCH resource) for each SPS occasion. For example, in example 500, SPS Occasion A, SPS Occasion B, and SPS Occasion C are each associated with a respective feedback resource. In some aspects, each SPS occasion associated with a particular SPS configuration may be configured with a respective feedback resource. For example, each occurrence of SPS Occasion B (corresponding to the first SPS configuration) may be configured with a corresponding feedback resource. By configuring individual PUCCH resources for each SPS occasion, delay associated with feedback for SPS communications may be reduced.

In example 505, the base station 110 may indicate a combined feedback resource for block feedback regarding multiple SPS resources. "Block feedback" is feedback regarding multiple communications that is transmitted on a single channel (such as a single PUCCH). In some aspects, the base station 110 may configure block feedback if there are multiple SPS configurations active. For example, if the first SPS configuration and one or more second SPS configurations are active, then the base station 110 may configure block feedback such that feedback regarding each of the multiple SPS configurations can be provided in a single PUCCH transmission.

In some aspects, the resource for the block feedback may be a PUCCH resource assigned for an initial SPS occasion (such as an earliest SPS occasion in time, or an SPS occasion associated with a first SPS configuration). In this case, the UE 120 may compress the block feedback regarding the multiple SPS configurations so that the block feedback can be transmitted on the PUCCH resource. In some other aspects, the resource for the block resource may at least partially overlap the resource assigned for the initial SPS occasion and may have an increased size relative to the resource assigned for the initial SPS occasion. In this case, the resources of the PUCCH resource can be signaled with the DCI activating the first SPS configuration and/or the second SPS configuration. For example, the DCI may indicate the resources of the PUCCH resource.

In some aspects, the UE 120 may transmit, on a feedback resource, information regarding a future uplink or downlink transmission (e.g., a future communication). For example, the UE 120 may transmit the information regarding the future uplink or downlink transmission if such information is available to or controlled by the UE 120. As one example, the UE 120 may determine that an upcoming downlink transmission is expected to be larger than a threshold size. For an XR communication, this determination may be based at least in part on information associated with a wearable device, such as pose information (e.g., information indicating a position, an orientation, or a rate of change of position or orientation of the wearable device). In this case, the UE 120 may transmit an indication that the upcoming downlink transmission is expected to be larger than the threshold size via the feedback resource. In some aspects, the information regarding the future uplink or downlink transmission may indicate an SPS configuration to activate for the future uplink or downlink transmission, which SPS occasion to use for the future uplink or downlink transmission, a number of SPS occasions to use or activate for the future uplink or downlink transmission, or the like. In some aspects, the information regarding the future uplink or downlink transmission may be transmitted via a configured grant (CG) transmission.

As indicated above, FIGS. 3-5 are provided as one or more examples. Other examples may differ from what is described with regard to FIGS. 3-5.

Figure 6:
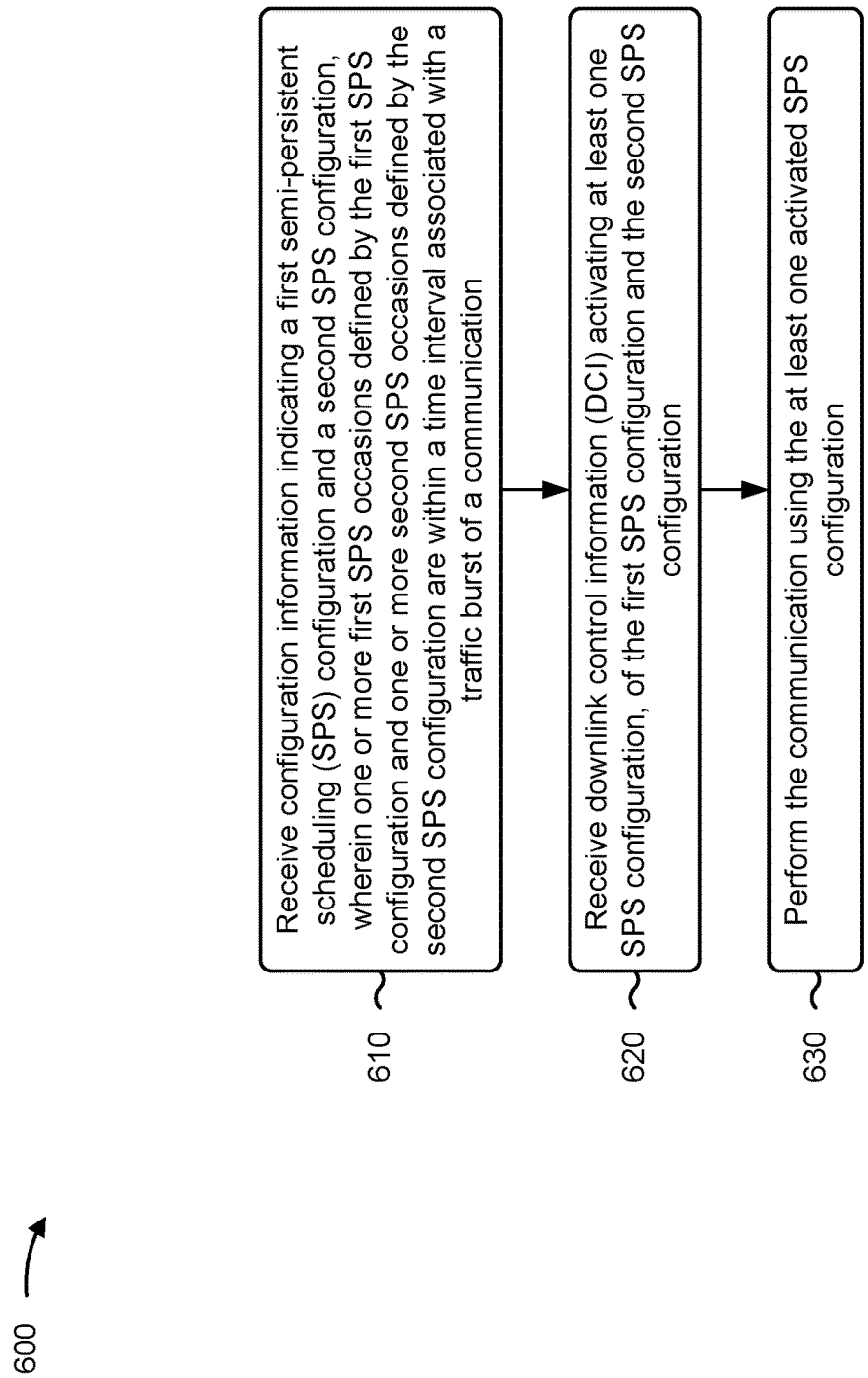
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) (e.g., an apparatus of the UE) performs operations associated with semi-persistent scheduling, such as for extended reality.

As shown in FIG. 6, in some aspects, process 600 may include receiving configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication (block 610). For example, the UE (e.g., using communication manager 140 and/or reception component 802, depicted in FIG. 10) may receive configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication, as described above, for example, in connection with the configuration information of FIG. 3 and the SPS configurations of FIG. 4.

As further shown in FIG. 6, in some aspects, process 600 may include receiving DCI activating at least one SPS configuration, of the first SPS configuration and the second SPS configuration (block 620). For example, the UE (e.g., using communication manager 140 and/or reception component 802, depicted in FIG. 10) may receive DCI activating at least one SPS configuration, of the first SPS configuration and the second SPS configuration, as described above.

As further shown in FIG. 6, in some aspects, process 600 may include performing the communication using the at least one activated SPS configuration (block 630). For example, the UE (e.g., using communication manager 140, transmission component 804, and/or reception component 802, depicted in FIG. 10) may perform the communication using the at least one activated SPS configuration, as described above.

Process 600 may include additional aspects, such as any single aspect or any combination of aspects described below and/or in connection with one or more other processes described elsewhere herein.

In a first aspect, an SPS occasion, of the one or more second SPS occasions, occurs before the one or more first SPS occasions and within the time interval, or after the one or more first SPS occasions and within the time interval. In a second aspect, alone or in combination with the first aspect, the DCI comprises first DCI activating the first SPS configuration, and second DCI activating the second SPS configuration. In a third aspect, alone or in combination with one or more of the first and second aspects, the second DCI is received based at least in part on the jitter of the communication satisfying a threshold.

In a fourth aspect, alone or in combination with one or more of the first through third aspects, the first SPS configuration and the second SPS configuration are associated with one or more of a same periodicity, or a same modulation and coding scheme. In a fifth aspect, alone or in combination with one or more of the first through fourth aspects, process 600 includes deactivating (e.g., using communication manager 140 and/or SPS component 808) the second SPS configuration after a deactivation time interval has elapsed without the UE communicating on the one or more second SPS occasions. In a sixth aspect, alone or in combination with one or more of the first through fifth aspects, the one or more first SPS occasions and the one or more second SPS occasions are associated with a same HARQ process identifier, and wherein the at least one activated SPS configuration includes only one of the one or more first SPS occasions and the one or more second SPS occasions.

In a seventh aspect, alone or in combination with one or more of the first through sixth aspects, the one or more first SPS occasions uses a HARQ process identifier selected from a first pool of HARQ process identifiers and wherein the one or more second SPS occasions uses a HARQ process identifier selected from a second pool of HARQ process identifiers. In an eighth aspect, alone or in combination with one or more of the first through seventh aspects, the at least one activated SPS configuration includes both of the first SPS configuration and the second SPS configuration. In a ninth aspect, alone or in combination with one or more of the first through eighth aspects, the second pool of HARQ process identifiers is based at least in part on an offset relative to the first pool of HARQ process identifiers, and wherein the offset is indicated in the downlink control information.

In a tenth aspect, alone or in combination with one or more of the first through ninth aspects, the configuration information indicates a respective feedback resource for each SPS occasion of the one or more first SPS occasions and the one or more second SPS occasions. In an eleventh aspect, alone or in combination with one or more of the first through tenth aspects, the configuration information indicates a combined feedback resource for the one or more first SPS occasions and the one or more second SPS occasions. In a twelfth aspect, alone or in combination with one or more of the first through eleventh aspects, process 600 includes transmitting (e.g., using communication manager 140 or transmission component 804) feedback regarding the one or more first SPS occasions and the one or more second SPS occasions on the combined feedback resource, wherein the feedback is compressed.

In a thirteenth aspect, alone or in combination with one or more of the first through twelfth aspects, the combined feedback resource at least partially overlaps a feedback resource of the one or more first SPS occasions. In a fourteenth aspect, alone or in combination with one or more of the first through thirteenth aspects, process 600 includes transmitting (e.g., using communication manager 140 or transmission component 804), on a resource associated with feedback regarding the communication or a configured grant resource, information indicating an SPS configuration to activate for a future communication. In a fifteenth aspect, alone or in combination with one or more of the first through fourteenth aspects, the time interval associated with jitter of the communication is based at least in part on an expected deviation of an actual arrival time of a packet relative to a scheduled arrival time of the packet.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
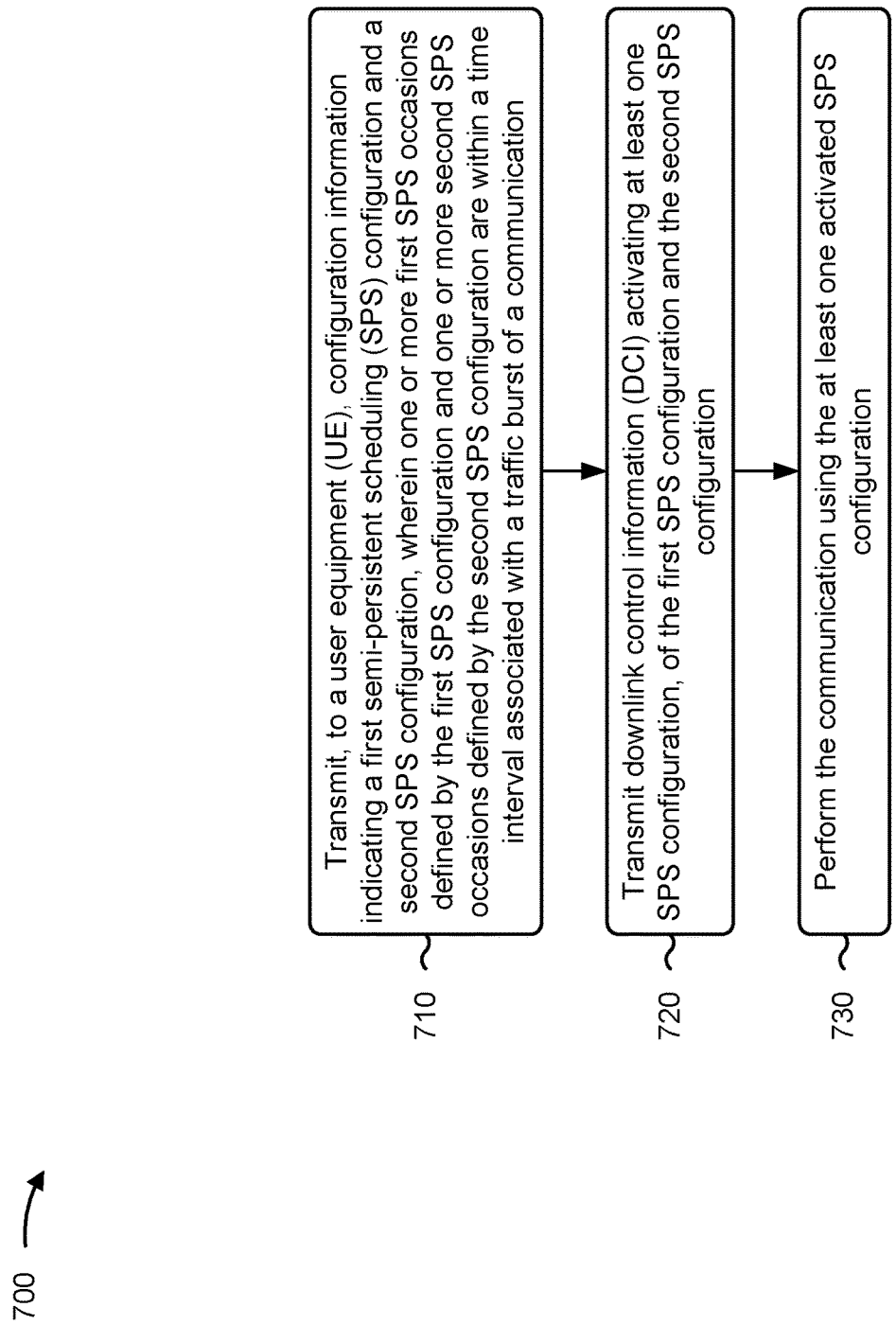
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110) (e.g., an apparatus of base station 110) performs operations associated with semi-persistent scheduling, such as for extended reality.

As shown in FIG. 7, in some aspects, process 700 may include transmitting, to a UE, configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication (block 710). For example, the base station (e.g., using communication manager 150 and/or transmission component 904, depicted in FIG. 11) may transmit, to a UE, configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication, as described above.

As further shown in FIG. 7, in some aspects, process 700 may include transmitting DCI activating at least one SPS configuration, of the first SPS configuration and the second SPS configuration (block 720). For example, the base station (e.g., using communication manager 150 and/or transmission component 904, depicted in FIG. 11) may transmit DCI activating at least one SPS configuration, of the first SPS configuration and the second SPS configuration, as described above.

As further shown in FIG. 7, in some aspects, process 700 may include performing the communication using the at least one activated SPS configuration (block 730). For example, the base station (e.g., using communication manager 150, reception component 902, and/or transmission component 904, depicted in FIG. 11) may perform the communication using the at least one activated SPS configuration, as described above.

Process 700 may include additional aspects, such as any single aspect or any combination of aspects described below and/or in connection with one or more other processes described elsewhere herein.

In a first aspect, the second SPS configuration occurs before the one or more first SPS occasions and within the time interval, or after the one or more first SPS occasions and within the time interval. In a second aspect, alone or in combination with the first aspect, transmitting the DCI activating the at least one SPS configuration further comprises transmitting first DCI activating the first SPS configuration, and transmitting second DCI, after the first DCI, activating the second SPS configuration. In a third aspect, alone or in combination with one or more of the first and second aspects, process 700 includes determining (e.g., using communication manager 150 or determination component 908) that the jitter of the communication satisfies a threshold, wherein transmitting the second DCI is based at least in part on the jitter of the communication satisfying the threshold.

In a fourth aspect, alone or in combination with one or more of the first through third aspects, the first SPS configuration and the second SPS configuration are associated with one or more of a same periodicity, or a same modulation and coding scheme. In a fifth aspect, alone or in combination with one or more of the first through fourth aspects, process 700 includes deactivating (e.g., using communication manager 150 or SPS component 910) the second SPS configuration after a deactivation time interval has elapsed without the base station communicating on the one or more second SPS occasions. In a sixth aspect, alone or in combination with one or more of the first through fifth aspects, the one or more first SPS occasions and the one or more second SPS occasions are associated with a same HARQ process identifier, and wherein the at least one activated SPS configuration includes only one of the one or more first SPS occasions and the one or more second SPS occasions.

In a seventh aspect, alone or in combination with one or more of the first through sixth aspects, the one or more first SPS occasions uses a HARQ process identifier selected from a first pool of HARQ process identifiers and wherein the one or more second SPS occasions uses a HARQ process identifier selected from a second pool of HARQ process identifiers. In an eighth aspect, alone or in combination with one or more of the first through seventh aspects, the at least one activated SPS configuration includes both of the first SPS configuration and the second SPS configuration. In a ninth aspect, alone or in combination with one or more of the first through eighth aspects, the second pool of HARQ process identifiers is based at least in part on an offset relative to the first pool of HARQ process identifiers, and wherein the offset is indicated in the downlink control information.

In a tenth aspect, alone or in combination with one or more of the first through ninth aspects, the configuration information indicates a respective feedback resource for each SPS occasion of the one or more first SPS occasions and the one or more second SPS occasions. In an eleventh aspect, alone or in combination with one or more of the first through tenth aspects, the configuration information indicates a combined feedback resource for the one or more first SPS occasions and the one or more second SPS occasions. In a twelfth aspect, alone or in combination with one or more of the first through eleventh aspects, process 700 includes receiving (e.g., using communication manager 150 or reception component 902 of FIG. 11) feedback regarding the one or more first SPS occasions and the one or more second SPS occasions on the combined feedback resource, wherein the feedback is compressed.

In a thirteenth aspect, alone or in combination with one or more of the first through twelfth aspects, the combined feedback resource at least partially overlaps a feedback resource of the one or more first SPS occasions. In a fourteenth aspect, alone or in combination with one or more of the first through thirteenth aspects, process 700 includes receiving (e.g., using communication manager 150 or reception component 902 of FIG. 11), on a resource associated with feedback regarding the communication or a configured grant resource, information indicating an SPS configuration to activate for a future communication, and activating the indicated SPS configuration for the future communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
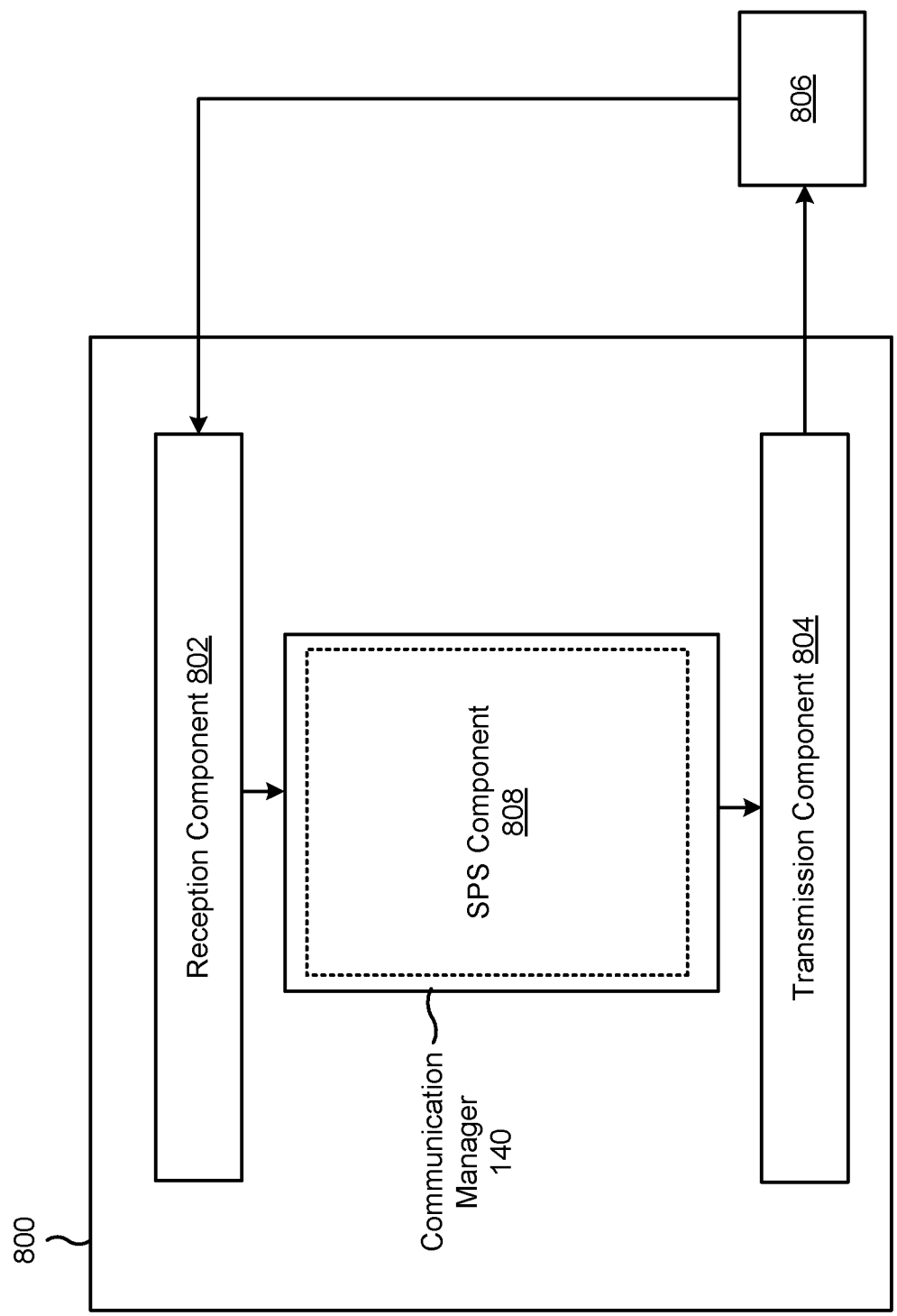
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include an SPS component 808, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication. The reception component 802 may receive DCI activating at least one SPS configuration, of the first SPS configuration and the second SPS configuration. The transmission component 804 or the reception component 802 may perform the communication using the at least one activated SPS configuration.

The SPS component 808 may deactivate the second SPS configuration after a deactivation time interval has elapsed without the UE communicating on the one or more second SPS occasions.

The transmission component 804 may transmit feedback regarding the one or more first SPS occasions and the one or more second SPS occasions on the combined feedback resource, wherein the feedback is compressed.

The transmission component 804 may transmit, on a resource associated with feedback regarding the communication or a configured grant resource, information indicating an SPS configuration to activate for a future communication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
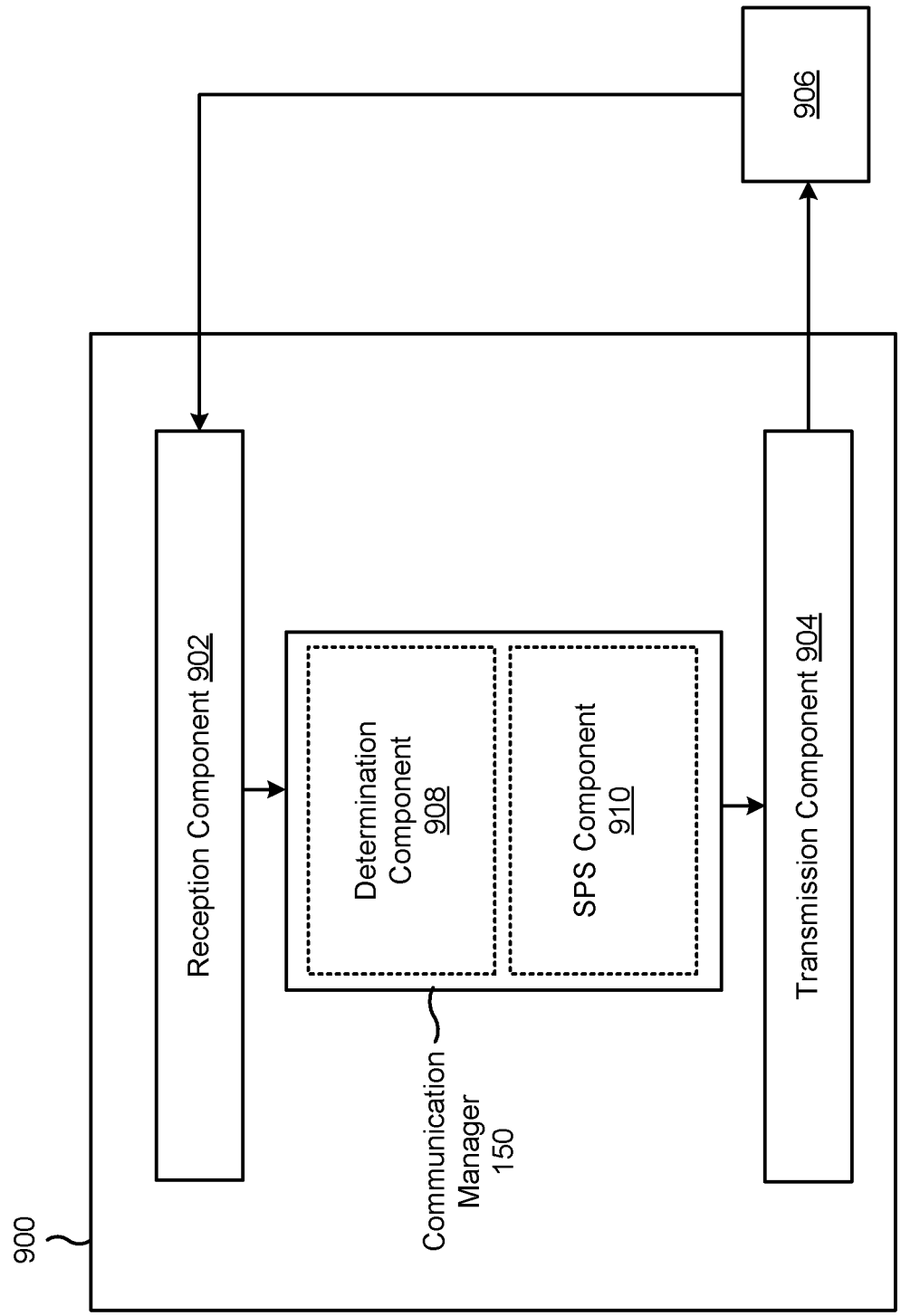
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of a determination component 908 or an SPS component 910, among other examples.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, configuration information indicating a first SPS configuration and a second SPS configuration, wherein one or more first SPS occasions defined by the first SPS configuration and one or more second SPS occasions defined by the second SPS configuration are within a time interval associated with a traffic burst of a communication. The transmission component 904 may transmit DCI activating at least one SPS configuration, of the first SPS configuration and the second SPS configuration. The transmission component 904 or the reception component 902 may perform the communication using the at least one activated SPS configuration.

The determination component 908 may determine that the jitter of the communication satisfies a threshold, wherein transmitting the second DCI is based at least in part on the jitter of the communication satisfying the threshold.

The SPS component 910 may deactivate the second SPS configuration after a deactivation time interval has elapsed without the base station communicating on the one or more second SPS occasions.

The reception component 902 may receive feedback regarding the one or more first SPS occasions and the one or more second SPS occasions on the combined feedback resource, wherein the feedback is compressed.

The reception component 902 may receive, on a resource associated with feedback regarding the communication or a configured grant resource, information indicating an SPS configuration to activate for a future communication.

The SPS component 910 may activate the indicated SPS configuration for the future communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving configuration information indicating a first semi-persistent scheduling (SPS) configuration and a second SPS configuration, wherein one or more first SPS occasions defined by the first SPS configuration and one or more second SPS occasions defined by the second SPS configuration are within a time interval associated with a traffic burst of a communication; receiving downlink control information (DCI) activating at least one SPS configuration, of the first SPS configuration and the second SPS configuration; and performing the communication using the at least one activated SPS configuration.

Aspect 2: The method of Aspect 1, wherein the second SPS configuration occurs before the one or more first SPS occasions and within the time interval, or after the one or more first SPS occasions and within the time interval.

Aspect 3: The method of any of Aspects 1-2, wherein the DCI comprises: first DCI activating the first SPS configuration; and second DCI activating the second SPS configuration.

Aspect 4: The method of Aspect 3, wherein the second DCI is received based at least in part on a jitter of the communication satisfying a threshold.

Aspect 5: The method of any of Aspects 1-4, wherein the first SPS configuration and the second SPS configuration are associated with one or more of: a same periodicity, or a same modulation and coding scheme.

Aspect 6: The method of any of Aspects 1-5, further comprising: deactivating the second SPS configuration after a deactivation time interval has elapsed without the UE communicating on the one or more second SPS occasions.

Aspect 7: The method of any of Aspects 1-6, wherein the one or more first SPS occasions and the one or more second SPS occasions are associated with a same hybrid automatic repeat request (HARQ) process identifier, and wherein the at least one activated SPS configuration includes only one of the one or more first SPS occasions and the one or more second SPS occasions.

Aspect 8: The method of any of Aspects 1-7, wherein the one or more first SPS occasions use one or more hybrid automatic repeat request (HARQ) process identifiers selected from a first pool of HARQ process identifiers and wherein the one or more second SPS occasions use one or more HARQ process identifiers selected from a second pool of HARQ process identifiers.

Aspect 9: The method of Aspect 8, wherein the at least one activated SPS configuration includes both of the first SPS configuration and the second SPS configuration.

Aspect 10: The method of Aspect 8, wherein the second pool of HARQ process identifiers is based at least in part on an offset relative to the first pool of HARQ process identifiers, and wherein the offset is indicated in the downlink control information.

Aspect 11: The method of any of Aspects 1-10, wherein the configuration information indicates a respective feedback resource for each SPS occasion of the one or more first SPS occasions and the one or more second SPS occasions.

Aspect 12: The method of any of Aspects 1-10, wherein the configuration information indicates a combined feedback resource for the one or more first SPS occasions and the one or more second SPS occasions.

Aspect 13: The method of Aspect 12, further comprising: transmitting feedback regarding the one or more first SPS occasions and the one or more second SPS occasions on the combined feedback resource, wherein the feedback is compressed.

Aspect 14: The method of Aspect 12, wherein the combined feedback resource at least partially overlaps a feedback resource of the one or more first SPS occasions.

Aspect 15: The method of any of Aspects 1-14, further comprising: transmitting, on a resource associated with feedback regarding the communication or a configured grant resource, information indicating an SPS configuration to activate for a future communication.

Aspect 16: The method of any of Aspects 1-15, wherein the time interval associated with a traffic burst of the communication is based at least in part on an expected deviation of an actual arrival time of a packet relative to a scheduled arrival time of the packet.

Aspect 17: A method of wireless communication performed by a base station, comprising: transmitting, to a user equipment (UE), configuration information indicating a first semi-persistent scheduling (SPS) configuration and a second SPS configuration, wherein one or more first SPS occasions defined by the first SPS configuration and one or more second SPS occasions defined by the second SPS configuration are within a time interval associated with a traffic burst of a communication; transmitting downlink control information (DCI) activating at least one SPS configuration, of the first SPS configuration and the second SPS configuration; and performing the communication using the at least one activated SPS configuration.

Aspect 18: The method of Aspect 17, wherein the second SPS configuration occurs before the one or more first SPS occasions and within the time interval, or after the one or more first SPS occasions and within the time interval.

Aspect 19: The method of any of Aspects 17-18, wherein transmitting the DCI activating the at least one SPS configuration further comprises: transmitting first DCI activating the first SPS configuration; and transmitting second DCI, after the first DCI, activating the second SPS configuration.

Aspect 20: The method of Aspect 19, further comprising: determining that the jitter of the communication satisfies a threshold, wherein transmitting the second DCI is based at least in part on the jitter of the communication satisfying the threshold.

Aspect 21: The method of any of Aspects 17-20, wherein the first SPS configuration and the second SPS configuration are associated with one or more of: a same periodicity, or a same modulation and coding scheme.

Aspect 22: The method of any of Aspects 17-21, further comprising: deactivating the second SPS configuration after a deactivation time interval has elapsed without the base station communicating on the one or more second SPS occasions.

Aspect 23: The method of any of Aspects 17-22, wherein the one or more first SPS occasions and the one or more second SPS occasions are associated with a same hybrid automatic repeat request (HARQ) process identifier, and wherein the at least one activated SPS configuration includes only one of the one or more first SPS occasions and the one or more second SPS occasions.

Aspect 24: The method of any of Aspects 17-23, wherein the one or more first SPS occasions uses a hybrid automatic repeat request (HARQ) process identifier selected from a first pool of HARQ process identifiers and wherein the one or more second SPS occasions uses a HARQ process identifier selected from a second pool of HARQ process identifiers.

Aspect 25: The method of Aspect 24, wherein the at least one activated SPS configuration includes both of the first SPS configuration and the second SPS configuration.

Aspect 26: The method of Aspect 24, wherein the second pool of HARQ process identifiers is based at least in part on an offset relative to the first pool of HARQ process identifiers, and wherein the offset is indicated in the downlink control information.

Aspect 27: The method of any of Aspects 17-26, wherein the configuration information indicates a respective feedback resource for each SPS occasion of the one or more first SPS occasions and the one or more second SPS occasions.

Aspect 28: The method of any of Aspects 17-26, wherein the configuration information indicates a combined feedback resource for the one or more first SPS occasions and the one or more second SPS occasions.

Aspect 29: The method of Aspect 28, further comprising: receiving feedback regarding the one or more first SPS occasions and the one or more second SPS occasions on the combined feedback resource, wherein the feedback is compressed.

Aspect 30: The method of Aspect 28, wherein the combined feedback resource at least partially overlaps a feedback resource of the one or more first SPS occasions.

Aspect 31: The method of any of Aspects 17-30, further comprising: receiving, on a resource associated with feedback regarding the communication or a configured grant resource, information indicating an SPS configuration to activate for a future communication; and activating the indicated SPS configuration for the future communication.

Aspect 32: An apparatus for wireless communication at a device, comprising a processor; memory coupled with the processor; and instructions stored in the memory and executable by the processor to cause the apparatus to perform the method of one or more of Aspects 1-31.

Aspect 33: A device for wireless communication, comprising a memory and one or more processors coupled to the memory, the one or more processors configured to perform the method of one or more of Aspects 1-31.

Aspect 34: An apparatus for wireless communication, comprising at least one means for performing the method of one or more of Aspects 1-31.

Aspect 35: A non-transitory computer-readable medium storing code for wireless communication, the code comprising instructions executable by a processor to perform the method of one or more of Aspects 1-31.

Aspect 36: A non-transitory computer-readable medium storing a set of instructions for wireless communication, the set of instructions comprising one or more instructions that, when executed by one or more processors of a device, cause the device to perform the method of one or more of Aspects 1-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
 a memory; and
 one or more processors coupled to the memory, wherein the one or more processors are configured to:
  receive configuration information indicating a first semi-persistent scheduling (SPS) configuration and a second SPS configuration, wherein one or more first SPS occasions defined by the first SPS configuration and one or more second SPS occasions defined by the second SPS configuration are within a time interval associated with a traffic burst of a communication, the time interval being based at least in part on an expected jitter of the communication;
  receive downlink control information (DCI) activating at least one SPS configuration, of the first SPS configuration and the second SPS configuration; and
  perform the communication using the at least one activated SPS configuration.

2. The apparatus of claim 1, wherein an SPS occasion, of the one or more second SPS occasions, occurs before the one or more first SPS occasions and within the time interval, or after the one or more first SPS occasions and within the time interval.

3. The apparatus of claim 1, wherein the DCI comprises:
 first DCI activating the first SPS configuration; and
 second DCI activating the second SPS configuration.

4. The apparatus of claim 1, wherein the first SPS configuration and the second SPS configuration are associated with one or more of:
 a same periodicity, or
 a same modulation and coding scheme.

5. The apparatus of claim 1, wherein the one or more processors are further configured to:
 deactivate the second SPS configuration after a deactivation time interval has elapsed without the UE communicating on the one or more second SPS occasions.

6. The apparatus of claim 1, wherein the one or more first SPS occasions and the one or more second SPS occasions are associated with a same hybrid automatic repeat request (HARQ) process identifier, and wherein the at least one activated SPS configuration includes only one of the one or more first SPS occasions and the one or more second SPS occasions.

7. The apparatus of claim 1, wherein the one or more first SPS occasions use one or more hybrid automatic repeat request (HARQ) process identifiers selected from a first pool of HARQ process identifiers and wherein the one or more second SPS occasions use one or more HARQ process identifiers selected from a second pool of HARQ process identifiers.

8. The apparatus of claim 1, wherein the configuration information indicates a respective feedback resource for each SPS occasion of the one or more first SPS occasions and the one or more second SPS occasions.

9. The apparatus of claim 1, wherein the configuration information indicates a combined feedback resource for the one or more first SPS occasions and the one or more second SPS occasions.

10. The apparatus of claim 1, wherein the one or more processors are further configured to:
 transmit, on a resource associated with feedback regarding the communication or a configured grant resource, information indicating an SPS configuration to activate for a future communication.

11. The apparatus of claim 1, wherein the time interval associated with the traffic burst of the communication is based at least in part on the expected jitter of the communication.

12. An apparatus for wireless communication at a network entity, comprising:
 a memory; and
 one or more processors coupled to the memory, wherein the one or more processors are configured to:
  transmit, to a user equipment (UE), configuration information indicating a first semi-persistent scheduling (SPS) configuration and a second SPS configuration, wherein one or more first SPS occasions defined by the first SPS configuration and one or more second SPS occasions defined by the second SPS configuration are within a time interval associated with a traffic burst of a communication, the time interval being based at least in part on an expected jitter of the communication;
  transmit downlink control information (DCI) activating at least one SPS configuration, of the first SPS configuration and the second SPS configuration; and
  perform the communication using the at least one activated SPS configuration.

13. The apparatus of claim 12, wherein a second SPS occasion, of the one or more second SPS occasions, occurs before the one or more first SPS occasions and within the time interval, or after the one or more first SPS occasions and within the time interval.

14. The apparatus of claim 12, wherein the one or more processors, to transmit the DCI activating the at least one SPS configuration, are configured to:
 transmit first DCI activating the first SPS configuration; and
 transmit second DCI, after the first DCI, activating the second SPS configuration.

15. The apparatus of claim 12, wherein the first SPS configuration and the second SPS configuration are associated with one or more of:
 a same periodicity, or
 a same modulation and coding scheme.

16. The apparatus of claim 12, wherein the one or more processors are further configured to:
 deactivate the second SPS configuration after a deactivation time interval has elapsed without the network entity communicating on the one or more second SPS occasions.

17. The apparatus of claim 12, wherein the one or more first SPS occasions and the one or more second SPS occasions are associated with a same hybrid automatic repeat request (HARQ) process identifier, and wherein the at least one activated SPS configuration includes only one of the one or more first SPS occasions and the one or more second SPS occasions.

18. The apparatus of claim 12, wherein the one or more first SPS occasions use one or more hybrid automatic repeat request (HARQ) process identifiers selected from a first pool of HARQ process identifiers and wherein the one or more second SPS occasions uses one or more HARQ process identifiers selected from a second pool of HARQ process identifiers.

19. The apparatus of claim 12, wherein the configuration information indicates a respective feedback resource for each SPS occasion of the one or more first SPS occasions and the one or more second SPS occasions.

20. The apparatus of claim 12, wherein the configuration information indicates a combined feedback resource for the one or more first SPS occasions and the one or more second SPS occasions.

21. The apparatus of claim 12, wherein the one or more processors are further configured to:
receive, on a resource associated with feedback regarding the communication or a configured grant resource, information indicating an SPS configuration to activate for a future communication; and
activate the indicated SPS configuration for the future communication.

22. A method of wireless communication performed by a user equipment (UE), comprising:
receiving configuration information indicating a first semi-persistent scheduling (SPS) configuration and a second SPS configuration, wherein one or more first SPS occasions defined by the first SPS configuration and one or more second SPS occasions defined by the second SPS configuration are within a time interval associated with a traffic burst of a communication, the time interval being based at least in part on an expected jitter of the communication;
receiving downlink control information (DCI) activating at least one SPS configuration, of the first SPS configuration and the second SPS configuration; and
performing the communication using the at least one activated SPS configuration.

23. The method of claim 22, wherein an SPS occasion, of the one or more second SPS occasions, occurs before the one or more first SPS occasions and within the time interval, or after the one or more first SPS occasions and within the time interval.

24. The method of claim 22, wherein the DCI comprises:
first DCI activating the first SPS configuration; and
second DCI activating the second SPS configuration.

25. The method of claim 22, wherein the first SPS configuration and the second SPS configuration are associated with one or more of:
a same periodicity, or
a same modulation and coding scheme.

26. A method of wireless communication performed by a base station, comprising:
transmitting, to a user equipment (UE), configuration information indicating a first semi-persistent scheduling (SPS) configuration and a second SPS configuration, wherein one or more first SPS occasions defined by the first SPS configuration and one or more second SPS occasions defined by the second SPS configuration are within a time interval associated with a traffic burst of a communication, the time interval being based at least in part on an expected jitter of the communication;
transmitting downlink control information (DCI) activating at least one SPS configuration, of the first SPS configuration and the second SPS configuration; and
performing the communication using the at least one activated SPS configuration.

27. The method of claim 26, wherein a second SPS occasion, of the one or more second SPS occasions, occurs before the one or more first SPS occasions and within the time interval, or after the one or more first SPS occasions and within the time interval.

28. The method of claim 26, wherein transmitting the DCI activating the at least one SPS configuration further comprises:
transmitting first DCI activating the first SPS configuration; and
transmitting second DCI, after the first DCI, activating the second SPS configuration.

29. The method of claim 28, further comprising:
determining that a jitter of the communication satisfies a threshold, wherein transmitting the second DCI is based at least in part on the jitter of the communication satisfying the threshold.

30. The method of claim 26, wherein the first SPS configuration and the second SPS configuration are associated with one or more of:
a same periodicity, or
a same modulation and coding scheme.

* * * * *